(12) United States Patent
Hull et al.

(10) Patent No.: US 7,551,312 B1
(45) Date of Patent: Jun. 23, 2009

(54) ANNOTABLE DOCUMENT PRINTER

(75) Inventors: Jonathan J. Hull, San Carlos, CA (US); Jamey Graham, San Jose, CA (US)

(73) Assignee: Ricoh Co., Ltd., Tokyo (JP)

( * ) Notice: Subject to any disclaimer, the term of this patent is extended or adjusted under 35 U.S.C. 154(b) by 76 days.

(21) Appl. No.: 11/083,902

(22) Filed: Mar. 17, 2005

(51) Int. Cl.
G06K 15/00 (2006.01)

(52) U.S. Cl. .............. 358/1.18; 358/1.15; 358/1.9; 715/232; 715/230; 715/202; 715/222; 715/224; 715/246

(58) Field of Classification Search .......... 382/1.15; 715/232, 230, 200, 201, 202, 203, 204, 221, 715/222, 224, 246, 247; 358/1.15, 1.18, 358/1.9, 1.6
See application file for complete search history.

(56) References Cited

U.S. PATENT DOCUMENTS

| | | | |
|---|---|---|---|
| 4,133,007 A | 1/1979 | Wessler et al. |
| 4,205,780 A | 6/1980 | Burns et al. |
| 4,437,378 A | 3/1984 | Ishida et al. |
| 4,619,522 A | 10/1986 | Imai |
| 4,635,132 A | 1/1987 | Nakamura |
| 4,734,898 A | 3/1988 | Morinaga |
| 4,754,485 A | 6/1988 | Klatt |
| 4,807,186 A | 2/1989 | Ohnishi et al. |
| 4,831,610 A | 5/1989 | Hoda et al. |
| 4,881,135 A | 11/1989 | Heilweil |
| 4,907,973 A | 3/1990 | Hon et al. |
| 4,998,215 A | 3/1991 | Black et al. |
| 5,059,126 A | 10/1991 | Kimball |
| 5,091,948 A | 2/1992 | Kametani |
| 5,093,730 A | 3/1992 | Ishii et al. |
| 5,115,967 A | 5/1992 | Wedekind |
| 5,136,563 A | 8/1992 | Takemasa et al. |
| 5,170,935 A | 12/1992 | Federspiel et al. |
| 5,220,649 A | 6/1993 | Forcier |
| 5,231,698 A | 7/1993 | Forcier |
| 5,237,648 A | 8/1993 | Mills et al. |
| 5,270,989 A | 12/1993 | Kimura |
| 5,343,251 A | 8/1994 | Nafeh |

(Continued)

FOREIGN PATENT DOCUMENTS

CA    2386829    11/2002

(Continued)

OTHER PUBLICATIONS

M. Lamming and W. Newman, Using Automatically Generated Descriptions of Human Activity to Index Multimedia Data, IEEE Multimedia Communications and Applications IEE Colloquium, Feb. 7, 1991, p. 5/1-5/3.*

(Continued)

*Primary Examiner*—King Y Poon
*Assistant Examiner*—Jamares Washington
(74) *Attorney, Agent, or Firm*—Fenwick & West LLP (57) ABSTRACT

A printer receives a multimedia document as input and creates two documents as output: a paper version of the multimedia document and a "mapping" file that maps marks on the physical pages onto actions. The mapping table is supplied to an application associated with a pen-capture device that can be attached to the paper version of the multimedia document and used to receive the marks applied to the paper.

34 Claims, 8 Drawing Sheets

U.S. PATENT DOCUMENTS

| | | |
|---|---|---|
| 5,386,510 A | 1/1995 | Jacobs |
| 5,428,555 A | 6/1995 | Starkey et al. |
| 5,432,532 A | 7/1995 | Mochimaru et al. |
| 5,436,792 A | 7/1995 | Leman et al. |
| 5,438,426 A | 8/1995 | Miake et al. |
| 5,444,476 A | 8/1995 | Conway et al. |
| 5,479,600 A | 12/1995 | Wroblewski et al. |
| 5,480,306 A | 1/1996 | Liu |
| 5,485,554 A | 1/1996 | Lowitz et al. |
| 5,493,409 A | 2/1996 | Maeda et al. |
| 5,524,085 A | 6/1996 | Bellucco et al. |
| 5,568,406 A | 10/1996 | Gerber |
| 5,572,651 A | 11/1996 | Weber et al. |
| 5,576,950 A | 11/1996 | Tonomura et al. |
| 5,581,366 A | 12/1996 | Merchant et al. |
| 5,590,257 A | 12/1996 | Forcier |
| 5,596,698 A | 1/1997 | Morgan |
| 5,617,138 A | 4/1997 | Ito et al. |
| 5,624,265 A | 4/1997 | Redford et al. |
| 5,627,936 A | 5/1997 | Prasad et al. |
| 5,628,684 A | 5/1997 | Bouedec |
| 5,633,723 A | 5/1997 | Sugiyama et al. |
| 5,640,193 A | 6/1997 | Wellner |
| 5,661,506 A | 8/1997 | Lazzouni et al. |
| 5,661,783 A | 8/1997 | Assis |
| 5,682,330 A | 10/1997 | Seaman et al. |
| 5,682,560 A | 10/1997 | Klotz, Jr. et al. |
| 5,690,496 A | 11/1997 | Kennedy |
| 5,706,097 A | 1/1998 | Schelling et al. |
| 5,717,841 A | 2/1998 | Farrell et al. |
| 5,721,883 A | 2/1998 | Katsuo et al. |
| 5,729,665 A | 3/1998 | Gauthier |
| 5,749,735 A | 5/1998 | Redford et al. |
| 5,757,897 A | 5/1998 | LaBarbera et al. |
| 5,761,380 A | 6/1998 | Lewis et al. |
| 5,764,368 A | 6/1998 | Shibaki et al. |
| 5,774,260 A | 6/1998 | Petitto et al. |
| 5,793,869 A | 8/1998 | Claflin, Jr. |
| 5,804,803 A | 9/1998 | Cragun et al. |
| 5,845,144 A | 12/1998 | Tateyama et al. |
| 5,877,764 A | 3/1999 | Feitelson et al. |
| 5,884,056 A | 3/1999 | Steele |
| 5,903,538 A | 5/1999 | Fujita et al. |
| 5,936,542 A | 8/1999 | Kleinrock et al. |
| 5,938,727 A | 8/1999 | Ikeda |
| 5,940,776 A | 8/1999 | Baron et al. |
| 5,941,936 A | 8/1999 | Taylor |
| 5,945,998 A | 8/1999 | Eick |
| 5,949,879 A | 9/1999 | Berson et al. |
| 5,962,839 A | 10/1999 | Eskildsen |
| 5,974,189 A | 10/1999 | Nicponski |
| 5,987,226 A | 11/1999 | Ishikawa et al. |
| 5,999,173 A | 12/1999 | Ubillos |
| 6,000,030 A | 12/1999 | Steinberg et al. |
| 6,006,241 A | 12/1999 | Purnaveja et al. |
| 6,020,916 A | 2/2000 | Gersberg et al. |
| 6,038,567 A | 3/2000 | Young |
| 6,043,904 A | 3/2000 | Nickerson |
| 6,076,733 A | 6/2000 | Wilz, Sr. et al. |
| 6,076,734 A | 6/2000 | Dougherty et al. |
| 6,081,261 A | 6/2000 | Wolff et al. |
| 6,098,106 A | 8/2000 | Philyaw et al. |
| 6,106,457 A | 8/2000 | Perkins et al. |
| 6,108,656 A | 8/2000 | Durst et al. |
| 6,111,567 A | 8/2000 | Savchenko et al. |
| 6,115,718 A | 9/2000 | Huberman et al. |
| 6,118,888 A | 9/2000 | Chino et al. |
| 6,123,258 A | 9/2000 | Iida |
| 6,125,229 A | 9/2000 | Dimitrova et al. |
| 6,138,151 A | 10/2000 | Reber et al. |
| 6,141,001 A | 10/2000 | Baleh |
| 6,148,094 A | 11/2000 | Kinsella |
| 6,152,369 A | 11/2000 | Wilz, Sr. et al. |
| 6,153,667 A | 11/2000 | Howald |
| 6,167,033 A | 12/2000 | Chang et al. |
| 6,170,007 B1 | 1/2001 | Venkatraman et al. |
| 6,175,489 B1 | 1/2001 | Markow et al. |
| 6,189,009 B1 | 2/2001 | Stratigos et al. |
| 6,193,658 B1 | 2/2001 | Wendelken et al. |
| 6,199,042 B1 | 3/2001 | Kurzweil |
| 6,256,638 B1 | 7/2001 | Dougherty et al. |
| 6,266,053 B1 | 7/2001 | French et al. |
| 6,296,693 B1 | 10/2001 | McCarthy |
| 6,297,812 B1 | 10/2001 | Ohara et al. |
| 6,297,851 B1 | 10/2001 | Taubman et al. |
| 6,298,145 B1 | 10/2001 | Zhang et al. |
| 6,302,527 B1 | 10/2001 | Walker |
| 6,307,956 B1 | 10/2001 | Black |
| 6,308,887 B1 | 10/2001 | Korman et al. |
| 6,330,976 B1 | 12/2001 | Dymetman et al. |
| 6,360,057 B1 | 3/2002 | Tsumagari et al. |
| 6,369,811 B1 | 4/2002 | Graham et al. |
| 6,373,498 B1 | 4/2002 | Abgrall |
| 6,373,585 B1 | 4/2002 | Mastie et al. |
| 6,375,298 B2 | 4/2002 | Purcell et al. |
| 6,378,070 B1 | 4/2002 | Chan et al. |
| 6,381,614 B1 | 4/2002 | Barnett et al. |
| 6,400,996 B1 | 6/2002 | Hoffberg et al. |
| 6,417,435 B2 | 7/2002 | Chantzis et al. |
| 6,421,738 B1 | 7/2002 | Ratan et al. |
| 6,439,465 B1 | 8/2002 | Bloomberg |
| 6,442,336 B1 | 8/2002 | Lemelson |
| 6,452,615 B1 * | 9/2002 | Chiu et al. ............... 715/776 |
| 6,466,534 B2 | 10/2002 | Cundiff, Sr. |
| 6,476,793 B1 | 11/2002 | Motoyama et al. |
| 6,476,834 B1 | 11/2002 | Doval et al. |
| 6,502,114 B1 | 12/2002 | Forcier |
| D468,277 S | 1/2003 | Sugiyama |
| 6,502,756 B1 | 1/2003 | Fåhraeus |
| 6,504,620 B1 | 1/2003 | Kinjo |
| 6,515,756 B1 | 2/2003 | Mastie et al. |
| 6,519,360 B1 | 2/2003 | Tanaka |
| 6,529,920 B1 * | 3/2003 | Arons et al. ............ 715/500.1 |
| 6,535,639 B1 * | 3/2003 | Uchihachi et al. ........... 382/225 |
| 6,544,294 B1 | 4/2003 | Greenfield et al. |
| 6,552,743 B1 | 4/2003 | Rissman |
| 6,556,241 B1 | 4/2003 | Yoshimura et al. |
| 6,568,595 B1 | 5/2003 | Russell et al. |
| 6,581,070 B1 | 6/2003 | Gibbon et al. |
| 6,587,859 B2 | 7/2003 | Dougherty et al. |
| 6,593,860 B2 | 7/2003 | Lai et al. |
| 6,594,377 B1 | 7/2003 | Kim et al. |
| 6,611,276 B1 | 8/2003 | Muratori et al. |
| 6,611,622 B1 | 8/2003 | Krumm |
| 6,611,628 B1 | 8/2003 | Sekiguchi et al. |
| 6,625,334 B1 | 9/2003 | Shiota et al. |
| 6,647,534 B1 | 11/2003 | Graham |
| 6,647,535 B1 | 11/2003 | Bozdagi et al. |
| 6,654,887 B2 | 11/2003 | Rhoads |
| 6,665,092 B2 | 12/2003 | Reed |
| 6,674,538 B2 | 1/2004 | Takahashi |
| 6,678,389 B1 | 1/2004 | Sun et al. |
| 6,687,383 B1 | 2/2004 | Kanevsky et al. |
| 6,700,566 B2 | 3/2004 | Shimoosawa et al. |
| 6,701,369 B1 | 3/2004 | Philyaw |
| 6,724,494 B1 | 4/2004 | Danknick |
| 6,728,466 B1 | 4/2004 | Tanaka |
| 6,745,234 B1 | 6/2004 | Philyaw et al. |
| 6,750,978 B1 | 6/2004 | Marggraff et al. |
| 6,753,883 B2 | 6/2004 | Schena et al. |
| 6,771,283 B2 | 8/2004 | Carro |
| 6,772,947 B2 | 8/2004 | Shaw |
| 6,774,951 B2 | 8/2004 | Narushima |
| 6,775,651 B1 | 8/2004 | Lewis et al. |

| Patent/Pub No. | Date | Name |
|---|---|---|
| 6,807,303 B1 | 10/2004 | Kim et al. |
| 6,824,044 B1 | 11/2004 | Lapstun et al. |
| 6,845,913 B2 | 1/2005 | Madding et al. |
| 6,853,980 B1 | 2/2005 | Ying et al. |
| 6,856,415 B1 | 2/2005 | Simchik et al. |
| 6,871,780 B2 | 3/2005 | Nygren et al. |
| 6,877,134 B1 | 4/2005 | Fuller et al. |
| 6,883,162 B2 | 4/2005 | Jackson et al. |
| 6,886,750 B2 | 5/2005 | Rathus et al. |
| 6,892,193 B2 | 5/2005 | Bolle et al. |
| 6,898,709 B1 | 5/2005 | Teppler |
| 6,904,168 B1 | 6/2005 | Steinberg et al. |
| 6,904,451 B1 | 6/2005 | Orfitelli et al. |
| 6,923,721 B2 | 8/2005 | Luciano et al. |
| 6,931,594 B1 | 8/2005 | Jun |
| 6,938,202 B1 | 8/2005 | Matsubayashi et al. |
| 6,946,672 B1 | 9/2005 | Lapstun et al. |
| 6,950,623 B2 | 9/2005 | Brown et al. |
| 6,964,374 B1 | 11/2005 | Djuknic et al. |
| 6,966,495 B2 | 11/2005 | Lynggaard et al. |
| 6,983,482 B2 | 1/2006 | Morita et al. |
| 7,000,193 B1 | 2/2006 | Impink, Jr. et al. |
| 7,023,459 B2 | 4/2006 | Arndt et al. |
| 7,031,965 B1 | 4/2006 | Moriya et al. |
| 7,075,676 B2 | 7/2006 | Owen |
| 7,079,278 B2 | 7/2006 | Sato |
| 7,089,420 B1 | 8/2006 | Durst et al. |
| 7,092,568 B2 | 8/2006 | Eaton |
| 7,131,058 B1 * | 10/2006 | Lapstun et al. ........... 715/501.1 |
| 7,134,016 B1 | 11/2006 | Harris |
| 7,149,957 B2 | 12/2006 | Hull et al. |
| 7,151,613 B1 | 12/2006 | Ito |
| 7,152,206 B1 | 12/2006 | Tsuruta |
| 7,162,690 B2 | 1/2007 | Gupta et al. |
| 7,174,151 B2 | 2/2007 | Lynch et al. |
| 7,181,502 B2 | 2/2007 | Incertis |
| 7,196,808 B2 | 3/2007 | Kofman et al. |
| 7,215,436 B2 | 5/2007 | Hull et al. |
| 7,228,492 B1 | 6/2007 | Graham |
| 7,263,659 B2 | 8/2007 | Hull et al. |
| 7,263,671 B2 | 8/2007 | Hull et al. |
| 7,280,738 B2 | 10/2007 | Kauffman et al. |
| 7,298,512 B2 | 11/2007 | Reese et al. |
| 7,363,580 B2 | 4/2008 | Tabata et al. |
| 2001/0003846 A1 | 6/2001 | Rowe et al. |
| 2001/0017714 A1 | 8/2001 | Komatsu et al. |
| 2001/0037408 A1 | 11/2001 | Thrift et al. |
| 2001/0052942 A1 | 12/2001 | MacCollum et al. |
| 2002/0001101 A1 | 1/2002 | Hamura et al. |
| 2002/0004807 A1 | 1/2002 | Graham et al. |
| 2002/0006100 A1 | 1/2002 | Cundiff, Sr. et al. |
| 2002/0010641 A1 | 1/2002 | Stevens et al. |
| 2002/0011518 A1 | 1/2002 | Goetz et al. |
| 2002/0015066 A1 | 2/2002 | Siwinski et al. |
| 2002/0023957 A1 | 2/2002 | Michaelis et al. |
| 2002/0048224 A1 | 4/2002 | Dygert et al. |
| 2002/0051010 A1 | 5/2002 | Jun et al. |
| 2002/0060748 A1 | 5/2002 | Aratani et al. |
| 2002/0066782 A1 | 6/2002 | Swaminathan et al. |
| 2002/0067503 A1 | 6/2002 | Hiatt |
| 2002/0078149 A1 | 6/2002 | Chang et al. |
| 2002/0087530 A1 | 7/2002 | Smith et al. |
| 2002/0087598 A1 | 7/2002 | Carro |
| 2002/0095501 A1 | 7/2002 | Chiloyan et al. |
| 2002/0099534 A1 | 7/2002 | Hegarty |
| 2002/0101343 A1 | 8/2002 | Patton |
| 2002/0101513 A1 | 8/2002 | Halverson |
| 2002/0131071 A1 | 9/2002 | Parry |
| 2002/0131078 A1 | 9/2002 | Tsukinokizawa |
| 2002/0134699 A1 | 9/2002 | Bradfield et al. |
| 2002/0135800 A1 | 9/2002 | Dutta |
| 2002/0137544 A1 | 9/2002 | Myojo |
| 2002/0140993 A1 | 10/2002 | Silverbrook |
| 2002/0159637 A1 | 10/2002 | Echigo et al. |
| 2002/0165769 A1 | 11/2002 | Ogaki et al. |
| 2002/0169849 A1 | 11/2002 | Schroath |
| 2002/0171857 A1 | 11/2002 | Hisatomi et al. |
| 2002/0185533 A1 | 12/2002 | Shieh et al. |
| 2002/0199149 A1 | 12/2002 | Nagasaki et al. |
| 2003/0002068 A1 | 1/2003 | Constantin et al. |
| 2003/0007776 A1 | 1/2003 | Kameyama et al. |
| 2003/0014615 A1 | 1/2003 | Lynggaard |
| 2003/0024975 A1 | 2/2003 | Rajasekharan |
| 2003/0025951 A1 | 2/2003 | Pollard et al. |
| 2003/0038971 A1 | 2/2003 | Renda |
| 2003/0051214 A1 | 3/2003 | Graham et al. |
| 2003/0065925 A1 | 4/2003 | Shindo et al. |
| 2003/0076521 A1 | 4/2003 | Li et al. |
| 2003/0084462 A1 | 5/2003 | Kubota et al. |
| 2003/0088582 A1 | 5/2003 | Pflug |
| 2003/0093384 A1 | 5/2003 | Durst et al. |
| 2003/0110926 A1 | 6/2003 | Sitrick et al. |
| 2003/0117652 A1 * | 6/2003 | Lapstun ........... 358/1.18 |
| 2003/0121006 A1 | 6/2003 | Tabata et al. |
| 2003/0128877 A1 | 7/2003 | Nicponski |
| 2003/0146927 A1 | 8/2003 | Crow et al. |
| 2003/0160898 A1 | 8/2003 | Baek et al. |
| 2003/0164898 A1 | 9/2003 | Imai |
| 2003/0177240 A1 | 9/2003 | Gulko et al. |
| 2003/0187642 A1 | 10/2003 | Ponceleon et al. |
| 2003/0218597 A1 | 11/2003 | Hodzic |
| 2003/0220988 A1 | 11/2003 | Hymel |
| 2003/0231198 A1 | 12/2003 | Janevski |
| 2004/0024643 A1 | 2/2004 | Pollock et al. |
| 2004/0036842 A1 | 2/2004 | Tsai et al. |
| 2004/0039723 A1 | 2/2004 | Lee et al. |
| 2004/0044894 A1 | 3/2004 | Lofgren et al. |
| 2004/0049681 A1 | 3/2004 | Diehl et al. |
| 2004/0118908 A1 | 6/2004 | Ando et al. |
| 2004/0125402 A1 | 7/2004 | Kanai et al. |
| 2004/0128514 A1 | 7/2004 | Rhoads |
| 2004/0128613 A1 | 7/2004 | Sinisi |
| 2004/0143459 A1 | 7/2004 | Engelson et al. |
| 2004/0143602 A1 | 7/2004 | Ruiz et al. |
| 2004/0150627 A1 | 8/2004 | Luman et al. |
| 2004/0156616 A1 | 8/2004 | Strub et al. |
| 2004/0167895 A1 | 8/2004 | Carro |
| 2004/0184064 A1 | 9/2004 | TaKeda et al. |
| 2004/0207876 A1 | 10/2004 | Aschenbrenner et al. |
| 2004/0215470 A1 | 10/2004 | Bodin |
| 2004/0229195 A1 | 11/2004 | Marggraff et al. |
| 2004/0240541 A1 | 12/2004 | Chadwick et al. |
| 2004/0249650 A1 | 12/2004 | Freedman et al. |
| 2005/0038794 A1 | 2/2005 | Piersol |
| 2005/0064935 A1 | 3/2005 | Blanco |
| 2005/0068569 A1 | 3/2005 | Hull et al. |
| 2005/0068581 A1 | 3/2005 | Hull et al. |
| 2005/0083413 A1 | 4/2005 | Reed et al. |
| 2005/0125717 A1 * | 6/2005 | Segal et al. ........... 715/512 |
| 2005/0149849 A1 | 7/2005 | Graham et al. |
| 2005/0213153 A1 | 9/2005 | Hull et al. |
| 2005/0216838 A1 | 9/2005 | Graham |
| 2005/0216852 A1 | 9/2005 | Hull et al. |
| 2006/0043193 A1 | 3/2006 | Brock |
| 2006/0136343 A1 | 6/2006 | Coley et al. |
| 2006/0171559 A1 | 8/2006 | Rhoads |
| 2006/0250585 A1 | 11/2006 | Anderson et al. |
| 2007/0033419 A1 | 2/2007 | Kocher et al. |
| 2007/0065094 A1 | 3/2007 | Chien et al. |
| 2007/0109397 A1 | 5/2007 | Yuan et al. |
| 2007/0162858 A1 | 7/2007 | Hurley et al. |
| 2007/0168426 A1 | 7/2007 | Ludwig et al. |
| 2007/0234196 A1 | 10/2007 | Nicol et al. |
| 2007/0268164 A1 | 11/2007 | Lai et al. |

2008/0037043 A1  2/2008  Hull et al.

FOREIGN PATENT DOCUMENTS

| CN | 1352765 A | 6/2002 |
|---|---|---|
| CN | 1097394 C | 12/2002 |
| EP | 1079313 A2 | 2/2001 |
| EP | 1133170 A2 | 9/2001 |
| WO | WO 99/18523 | 4/1999 |
| WO | WO 02/082316 A1 | 10/2002 |

OTHER PUBLICATIONS

U.S. Appl. No. 10/814,842, filed Mar. 30, 2004, Hull et al.
U.S. Appl. No. 10/814,580, filed Mar. 30, 2004, Peirsol et al.
U.S. Appl. No. 10/660,867, filed Sep. 12, 2003, Erol, et al.
"Seiko Instruments USA, Inc.—Business and Home Office Products" online, date unknown, Seiko Instruments USA, Inc., [retrieved on Jan. 25, 2005]. Retrieved from the Internet: <URL: http://www.siibusinessproducts.com/products/link-ir-p-html>.
"Tasty FotoArt" [online], date unknown, Tague Technologies, Inc., [retrieved on Mar. 8, 3005]. Retrieved from the Internet: <URL: http//www.tastyfotoart.com>.
Gropp, W. et al., "Using MPI-Portable Programming with the Message Passing Interface," copyright 1999, pp. 35-42, second edition, MIT Press.
Poon, K.M. et al., "Performance Analysis of Median Filtering on Meiko™—A Distributed Multiprocessor System," IEEE First International Conference on Algorithms and Architectures for Parallel Processing, 1995, pp. 631-639.
Dimitrova, N. et al., "Applications of Video-Content Analysis and Retrieval," IEEE Multimedia, Jul.-Sep. 2002, pp. 42-55.
European Search Report, EP 04255836, Sep. 12, 2006, 4 pages.
European Search Report, EP 04255837, Sep. 5, 2006, 3 pages.
European Search Report, EP 04255839, Sep. 4, 2006, 3 pages.
European Search Report, EP 04255840, Sep. 12, 2006, 3 pages.
Graham, J. et al., "A Paper-Based Interface for Video Browsing and Retrieval," ICME '03, Jul. 6-9, 2003, pp. 749-752, vol. 2.
Graham, J. et al., "Video Paper: A Paper-Based Interface for Skimming and Watching Video," ICCE '02, Jun. 18-20, 2002, pp. 214-215.
Klemmer, S.R. et al., "Books With Voices: Paper Transcripts as a Tangible Interface to Oral Histories," CHI Letters, Apr. 5-10, 2003, pp. 89-96, vol. 5, Issue 1.
Minami, K. et al., "Video Handling with Music and Speech Detection," IEEE Multimedia, Jul.-Sep. 1998, pp. 17-25.
Shahraray, B. et al, "Automated Authoring of Hypermedia Documents of Video Programs," ACM Multimedia '95 Electronic Proceedings, San Francisco, CA, Nov. 5-9, 1995, pp. 1-12.
Shahraray, B. et al., "Pictorial Transcripts: Multimedia Processing Applied to Digital Library Creation," IEEE, 1997, pp. 581-586.
Configuring A Printer (NT), Oxford Computer Support [online] [Retrieved on Nov. 13, 2003] Retrieved from the Internet<URL: http://www.nox.ac.uk/cehoxford/ccs/facilities/printers/configat.htm>.
"DocumentMail Secure Document Management" [online] [Retrieved on Mar. 9, 2004]. Retrieved from the Internet <URL: http://www.documentmail.com>.
Gopal, S. et al., "Load Balancing in a Heterogeneous Computing Environment," Proceedings of the Thirty-First Hawaii International Conference on System Sciences, Jan. 6-9, 1998.
Girgensohn, Andreas et al., "Time-Constrained Keyframe Selection Technique," Multimedia Tools and Applications (2000), vol. 11, pp. 347-358.
Graham, Jamey et al., "A Paper-Based Interface for Video Browsing and Retrieval," IEEE International Conference on Multimedia and Expo (Jul. 6-9, 2003), vol. 2, p. II 749-752.
Graham, Jamey et al., "The Video Paper Multimedia Playback System," Proceedings of the 11$^{th}$ ACM International Conference on Multimedia (Nov. 2003), pp. 94-95.
Graham, Jamey et al., "Video Paper: A Paper-Based Interface for Skimming and Watching Video," International Conference on Consumer Electronics (Jun. 16-18, 2002), pp. 214-215.

Gropp, W. et al., "Using MPI—Portable Programming with the Message-Passing Interface," copyright 1999, pp. 35-42, second edition, MIT Press.
Hull, Jonathan J. et al., "Visualizing Multimedia Content on Paper Documents: Components of Key Frame Selection for Video Paper," Proceedings of the 7$^{th}$ International Conference on Document Analysis and Recognition (2003), vol. 1, pp. 389-392.
"Kofax: Ascent Capture: Overview" [online] [Retrieved on Jan. 22, 2004]. Retrieved form the Internet: <URL http://www.kofax.com/products/ascent/capture>.
Label Producer by Maxell, [online] [Retrieved on Nov. 11, 2003]. Retrieved from the Internet<URL: http://www.maxell.co.jp/products/consumer/rabel_card/>.
Movie-PhotoPrint by Canon, [online] [Retrieved on Nov. 11, 2003]. Retrieved from the Internet<URL: http://cweb.canon.jp/hps/guide/rimless.html>.
PostScript Language Document Structuring Conventions Specification, Version 3.0 (Sep. 25, 1992), Adobe Systems Incorporated.
Print From Cellular Phone by Canon, [online] [Retrieved on Nov. 11, 2003]. Retrieved from the Internet<URL: http://cweb.canon.jp/bj/enjoy/pbeam/index.html>.
Print Images Plus Barcode by Fuji Xerox, [online] [Retrieved on Nov. 11, 2003]. Retrieved from the Internet<URL: http://www.fujixerox.co.jp/soft/cardgear/release.html>.
Print Scan-Talk By Barcode by Epson, [online] [Retrieved on Nov. 11, 2003]. Retrieved from the Internet<URL: http://www.epson.co.jp/osirase/2000/000217.htm>.
Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.
R200 ScanTalk [online] (date unknown). Retrieved from the Internet<URL: http://homepage2.nifty.com/vasolza/ScanTalk.htm>.
Variety of Media In, Print Paper Out by Epson, [online] [Retrieved on Nov. 11, 2003]. Retrieved from the Internet<URL: http://www.i-love-epson.co.ip/products/spc/pma850/pma8503.htm>.
ASCII 24.com, [online] (date unknown), Retrieved from the Internet<URL: http://216.239.37.104/search?q=cache:z-G9M1EpvSUJ:ascii24.com/news/i/hard/article/1998/10/01/612952-000.html+%E3%82%B9%E3%...>.
Label Producer by Maxell, [online] [Retrieved on Nov. 11, 2003]. Retrieved from the Internet<URL: http://www.maxell.co.jp/products/consumer/rabel_card/>.
Movie-PhotoPrint by Canon, [online] [Retrieved on Nov. 11, 2003]. Retrieved from the Internet<URL: http://cweb.canon.jp/hps/guide/rimless.html>.
Print Images Plus Barcode by Fuji Xerox, [online] [Retrieved on Nov. 11, 2003]. Retrieved from the Internet<URL: http://www.fujixerox.co.jp/soft/cardgear/release/html>.
Arai, T. et al., "PaperLink: A Technique for Hyperlinking from Real Paper to Electronic Content," CHI 97, Atlanta, GA, Mar. 22-27, 1997, pp. 327-334.
Dorai, C. et al., "End-to-End VideoText Recognition for Multimedia Content Analysis," IEEE, International Conference on Multimedia and Expo, Aug. 2001, pp. 601-604.
Hecht, D.L., "Printed Embedded Data Graphical User Interfaces," Computer, Mar. 2001, pp. 47-55, vol. 34, Issue 3.
Klemmer, S.R. et al., "Books with Voices: Paper Transcripts as a Tangible Interface to Oral Histories," CHI 2003, Fort Lauderdale, FL, Apr. 5-10, 2003, pp. 89-96.
Communication Pursuant to Article 96(2) EPC, European Application No. 04255836.1, Jun. 11, 2007, 10 pages.
Stifelman, L. et al., "The Audio Notebook," SIGCHI 2001, Mar. 31-Apr. 5, 2001, pp. 182-189, vol. 3, No. 1, Seattle, WA.
Chinese Application No. 2004100849823 Office Action, Jun. 1, 2007, 24 pages.
Chinese Application No. 2004100897988 Office Action, Apr. 6, 2007, 8 pages.
Brown et al., "A Diary Study Of Information Capture In Working Life," Proceedings Of ACM CHI 2000 Conference On Human Factors In Computing Systems, 2000, pp. 438-445, vol. 1.

Erol, Berna et al., "Linking Multimedia Presentations With Their Symbolic Source Documents: Algorithm And Applications," ACM Multimedia '03, Nov. 2-8, 2003, pp. 498-507, Berkeley, CA.

Erol, Berna et al., "Prescient Paper: Multimedia Document Creation With Document Image Matching," 17th International Conference On Pattern Recognition, Aug. 2004, 4 pages, Cambridge, U.K.

Erol, Berna et al, "Retrieval Of Presentation Recordings With Digital Camera Images," IEEE Conference On Computer Vision And Pattern Recognition (CVPR), Jun. 27-Jul. 2, 2004, 2 pages, Washington, D.C.

Hardman, L. et al, "Integrating the Amsterdam Hypermedia Model with the Standard Reference Model for Intelligent Multimedia Presentation Systems," Computer Standards & Interfaces, 1997, pp. 497-507, vol. 18.

Karasik, D. "Image Processing in Perl Graphic Applications," Google, Apr. 2, 2003, pp. 1-12.

Lauesen, S., "User Interface Design: A Software Engineering Perspective," 2005, 28 pages.

Lienhart, Rainer et al., "Localizing And Segmenting Text In Images And Videos," IEEE Transactions On Circuits And Systems For Video Technology, Apr. 2002, pp. 256-268, vol. 12, No. 4.

"Microsoft Powerpoint—Wikipedia, the free encyclopedia," Wikimedia Foundation, Inc., [online] [Retrieved on Nov. 7, 2006] Retrieved from the internet <URL:http://en.wikipedia.org/wiki/Microsoft_PowerPoint>.

Otsu, N., "A Threshold Selection method From Gray-Level Histograms," IEEE Transactions on Systems, Man and Cybernetics, Jan. 1979, pp. 62-66, vol. SMC-9, No. 1.

Srihari, S.N. et al., "Name And Address Block Reader System For Tax Form Processing," IEEE, 1995, pp. 5-10.

U.S. Appl. No. 10/814,932, filed Mar. 30, 2004.
U.S. Appl. No. 10/814,751, filed Mar. 30, 2004.
U.S. Appl. No. 10/813,847, filed Mar. 30, 2004.
U.S. Appl. No. 10/814,931, filed Mar. 30, 2004.
U.S. Appl. No. 10/814,948, filed Mar. 30, 2004.
U.S. Appl. No. 10/814,386, filed Mar. 30, 2004.
U.S. Appl. No. 10/814,700, filed Mar. 30, 2004.
U.S. Appl. No. 10/814,500, filed Mar. 30, 2004.
U.S. Appl. No. 10/814,845, filed Mar. 30, 2004.
U.S. Appl. No. 09/714,785, filed Nov. 15, 2000.

Boreczky, J. et al., "An Interactive Comic Book Presentation for Exploring Video," CHI Letters, Apr. 1-6, 2000, pp. 185-192, vol. 2, Issue 1.

Buchanan, M.C. et al., "Multimedia Documents as User Interfaces," INTERCHI '93, Amsterdam, The Netherlands, Apr. 24-29, 1993, pp. 527-528.

Harada, K. et al., "Anecdote: A Multimedia Storyboarding System with Seamless Authoring Support," ACM Multimedia '96, Boston, MA, 1996, pp. 341-351.

Mackay, W. et al., "Augmenting Reality: Adding Computational Dimensions to Paper," Communications of the ACM, Jul. 1993, pp. 96-97, vol. 36, No. 7.

Mackay, W. et al., "Video Mosaic: Laying Out Time in a Physical Space," Multimedia '94, San Francisco, CA, Oct. 1994, pp. 165-172.

Makedon, F. et al., "Multimedia Authoring, Development Environments and Digital Video Editing," Dartmouth College Technical Report, PCS-TR94-231, 2001, pp. 1-24.

Nelson, L. et al, "Palette: A Paper Interface for Giving Presentations," CHI '99, May 1999, pp. 1-8.

Roschelle, J. et al., "VideoNoter: A Productivity Tool for Video Data Analysis," Behavior Research Methods, Instruments & Computers, 1991, pp. 219-224, vol. 23, No. 2.

Tonomura, Y. et al., "VideMAP and VideoSpaceIcon," INTERCHI '93, Amsterdam, The Netherlands, Apr. 24-29, 1993, pp. 131-136 and 544.

Wellner, P., "Interacting with Paper on the DigitalDesk," Communications of the ACM, Jul. 1993, pp. 87-96, vol. 36, No. 7.

* cited by examiner

Example of an Reformatted Multimedia Document

```
<docid>
    <num>115234</num>
    <digit1><num>1</num> <minx>1.0</minx><maxx>1.2</maxx><miny>6.8</miny><maxy>7.0</maxy></digit1>
    <digit2><num>1</num> <minx>2.0</minx><maxx>2.2</maxx><miny>6.8</miny><maxy>7.0</maxy></digit2>
    <digit3><num>5</num> <minx>3.8</minx><maxx>3.95</maxx><miny>6.8</miny><maxy>7.0</maxy></digit3>
    <digit4><num>2</num> <minx>4.2</minx><maxx>4.2</maxx><miny>6.8</miny><maxy>7.0</maxy></digit4>
    <digit5><num>3</num> <minx>5.4</minx><maxx>5.2</maxx><miny>6.8</miny><maxy>7.0</maxy></digit5>
    <digit6><num>4</num> <minx>6.6</minx><maxx>6.2</maxx><miny>6.8</miny><maxy>7.0</maxy></digit6>
</docid>

<controls>
    <play> <minx>3.0</minx>,maxx>3.8</maxx><miny>2.0</miny><maxy>2.8</maxy></play>
    <stop> <minx>4.0</minx>,maxx>4.8</maxx><miny>2.0</miny><maxy>2.8</maxy></stop>
    <fast forward> <minx>5.0</minx><maxx>5.8</maxx><miny>2.0</miny><maxy>2.8</maxy></fast forward>
    <rewind> <minx>6.0</minx><maxx>6.8</maxx><miny>2.0</miny><maxy>2.8</maxy></rewind>
</controls>

<note zones>
    <zone1>
        <minx>1.0</minx><maxx>7.0</maxx><miny>2.0</miny><maxy>3.0</maxy>
        <min time>00.00.00</min time>
        <max time>00.02.00</max time>
        <action>write_into_media</action>
        <timing>immediate</timing>
        <destination>http://www.ricoh.com/3867.mp4</destination>     510
    </zone1>
    <zone2>
        <minx>1.0</minx><maxx>7.0</maxx><miny>4.0</miny><maxy>5.0</maxy>
        <min time>00.02.01</min time>
        <max time>00.04.00</max time>
        <action>write_into_this_document</action>
        <timing>delayed</timing>
        <destination>http://www.ricoh.com/adp_nep_22867/115234</destination>   512
    </zone2>
    <zone3>
        <minx>1.0</minx><maxx>7.0</maxx><miny>4.0</miny><maxy>5.0</maxy>
        <min time>00.04.01</min time>
        <max time>00.06.00</max time>
        <action>OCR and email</action>
        <timing>delayed</timing>
        <destination>hull@ri.ricoh.com/</destination>    514
    </zone3>
</note zones>
```

FIG. 5
Example of a Mapping Table

Open-down 2.0 4.5
Draw 3.0 4.5
Pen-up

FIG. 6(a)

144.0 324.0 move
216.0 324.0 draw

ANNOTABLE DOCUMENT PRINTER

CROSS-REFERENCES TO RELATED APPLICATIONS

This application is related to the following two co-pending U.S. Patent Applications, each of which is hereby incorporated by reference in its entirety:

U.S. patent application Ser. No. 10/814,580, titled "Printer With Document-Triggered Processing," inventors Hull, Kurt W. Piersol and Peter E. Hart, filed Mar. 30, 2004.

U.S. patent application Ser. No. 10/814,842, titled "Printer with Multimedia Server," inventors Jonathan J. Hull, et al., filed Mar. 30, 2004.

BACKGROUND OF THE INVENTION

1. Field of the Invention

The present invention relates to systems and methods for allowing a user to indicate actions associated with multimedia content. In particular, the present invention relates to a system and method for receiving pen input from a user indicating actions associated with the multimedia content.

2. Description of the Background Art

Conventional printers receive documents and multimedia documents in a variety of formats and print the contents of the documents in accordance with a proper format. For example, a printer enabled to print PostScript documents will correctly interpret Postscript commands within a document so that the document has the appearance expected by its author when it is printed. (Postscript is a trademark of Adobe Systems Incorporated).

Today, storage and retrieval of multimedia documents is becoming problematic. A librarian, for example, may have a large number of multimedia documents, such as video files, to store. It is difficult for the librarian to continually retrieve videos for library users. Moreover, it is difficult for a library user to locate the portion of a video that he wished to view. Currently, the librarian stores the physical videos on a shelf and retrieves them when the library user needs them. The library user will then need to scan through each video, looking for the particular item or segment that he wants. This is not efficient and is prone to human error. In addition, the user must obtain a copy of the actual video stored on a medium such as tape, CD, or DVD in order to view the video and the user must further be supplied with a viewer of some kind in order for the user to be able to view the video.

U.S. application Ser. No. 10/660,867, filed Sep. 12, 2003, B. Erol, J. Graham, J. J. Hull, and D. S. Lee, "Using Paper Documents Printed Before a Presentation to Access Multimedia Information Captured During a Presentation," describes how a printout of presentation slides can be generated before a presentation takes place so that users can take notes on those slides during the presentation and how bar codes on those notes can be used for later replay of a recording of the presentation. This application is incorporated by reference herein. This system matches images of slides captured at print-time with images of slides captured by a presentation recorder to determine the time stamps that correspond to bar codes on the printed document.

What is needed is a system and method that can store multimedia content in a manner that allows easy storage, retrieval, and control of playback of the multimedia content. Ideally, the system would allow for annotation of multimedia content with or without having to simultaneously view the content.

SUMMARY

A printer is described that receives a multimedia document as input and creates two documents as output: a paper version of the multimedia document and a "mapping" table that maps marks on the physical pages of the paper version onto actions. Example actions include modifying the replay behavior of the multimedia document or adding handwritten annotations to the original multimedia file.

The mapping table is supplied to an application associated with a pen-capture device that can access the paper version of the multimedia document and receive the marks applied to the paper. Typically these are sequences of x-y coordinates interspersed with pen-up and pen-down indications. The application communicates with the pen in real-time if online interaction with something like a replay system is desired. Alternatively, the communication can be asynchronous, with the pen markings being made asynchronously with playing of the video. The data generated by the pen can be cached and downloaded sometime after interaction with the paper document is finished. In this case the pen could not be used for real-time control of the Multimedia Application, but it could still capture data synchronized to the timeline of the multimedia because of the placement of handwritten markings on the paper document.

BRIEF DESCRIPTION OF THE DRAWINGS

The invention is illustrated by way of example, and not by way of limitation in the figures of the accompanying drawings in which like reference numerals refer to similar elements.

FIG. 5 is an example of a mapping table shown in FIG. 1.

DETAILED DESCRIPTION OF PREFERRED EMBODIMENTS

A method and apparatus for a multimedia printer and an associated control system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Figure 1:
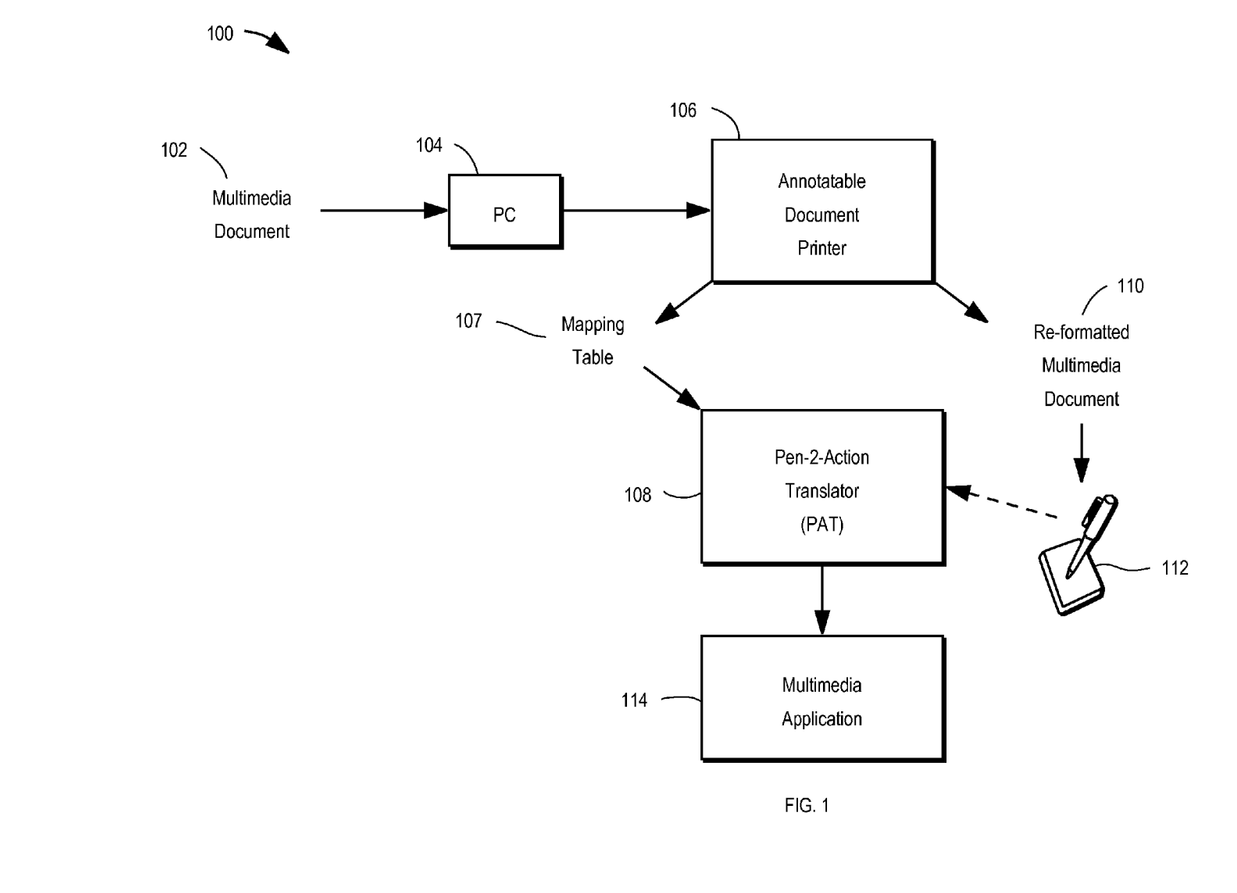
FIG. 1 is a block diagram showing an embodiment of the present invention.

FIG. 1 is a block diagram showing an embodiment of a system 100 in accordance with the present invention. System 100 includes a multimedia document 102. As used herein, the term "multimedia document" refers to anything in the print stream sent to the printer, including both printing and non-printing data, including printable documents, video documents, audio documents, tactile documents, olfactory documents (e.g., scratch and sniff), and edible documents (e.g., http://www.tastyfotoart.com/Machine.com). In FIG. 1, the document is sent to a data processing system 104, such as a PC, over a network, such as the Internet, an intranet, a wireless connection, a wide area network, or the like. Multimedia document 102 could also be generated using data processing system 104. An annotatable document printer (ADP) 106 receives the document from data processing system 104. ADP 106 prints a reformatted multimedia document 110. In some embodiments document 102 is also printed if it is printable. In addition, ADP 106 outputs a mapping table 107, which is described in detail below.

Either immediately or at a later time, a user uses an input device 112, such as a pen or a non-writing stylus, to mark up reformatted multimedia document 110. Device 112 sends input to a Pen-2-Action translator (PAT) 108. PAT 108 uses mapping table 107 and the input from device 112 to generate output for a multimedia application 114 as described in more detail below. In some embodiments, PAT 108 itself performs actions instead of or in addition to application 114. In certain embodiments, the mark ups from device 112 are used to annotate a paper document. In other embodiments, the mark ups from device 112 are used to control playback of a video or audio document. In other embodiments, the markups are converted to an appropriate format and written into the original multimedia document. In other embodiments, multimedia application 114 might be an application, such as the Windows Media Player, running on a nearby PC. Such an arrangement would let the user control replay of the associated media file by making marks on the paper document. In other embodiments, multimedia application 114 might be Microsoft PowerPoint or Microsoft Word. The marks are converted to a vector format that are stored in the object-oriented representation for the document that is maintained by the running application. It can then render those marks onto the image of the document shown on the screen of the PC and store those marks in the document's representation on disk.

Examples of pens that can be used as device 112 include the Seiko Ink-Link system and similar digitizing tablets. Other examples of device 112 include a regular pen writing on top of an x-y capture grid, and a stylus that does not actually make marks, but whose movement on document 110 is detected and captured.

In some embodiments, multimedia application 114 is connected to and controls a playback device, such as device to play back audio or video. As is described below, this control is caused by the user making marks on the reformatted multimedia document 110. In other embodiments, the application 114 is connected to a writing device that enables application 114 to write data into documents. In other embodiments, the application 114 is connected to a network that enables it to send emails or other types of messages over a network.

Figure 2:
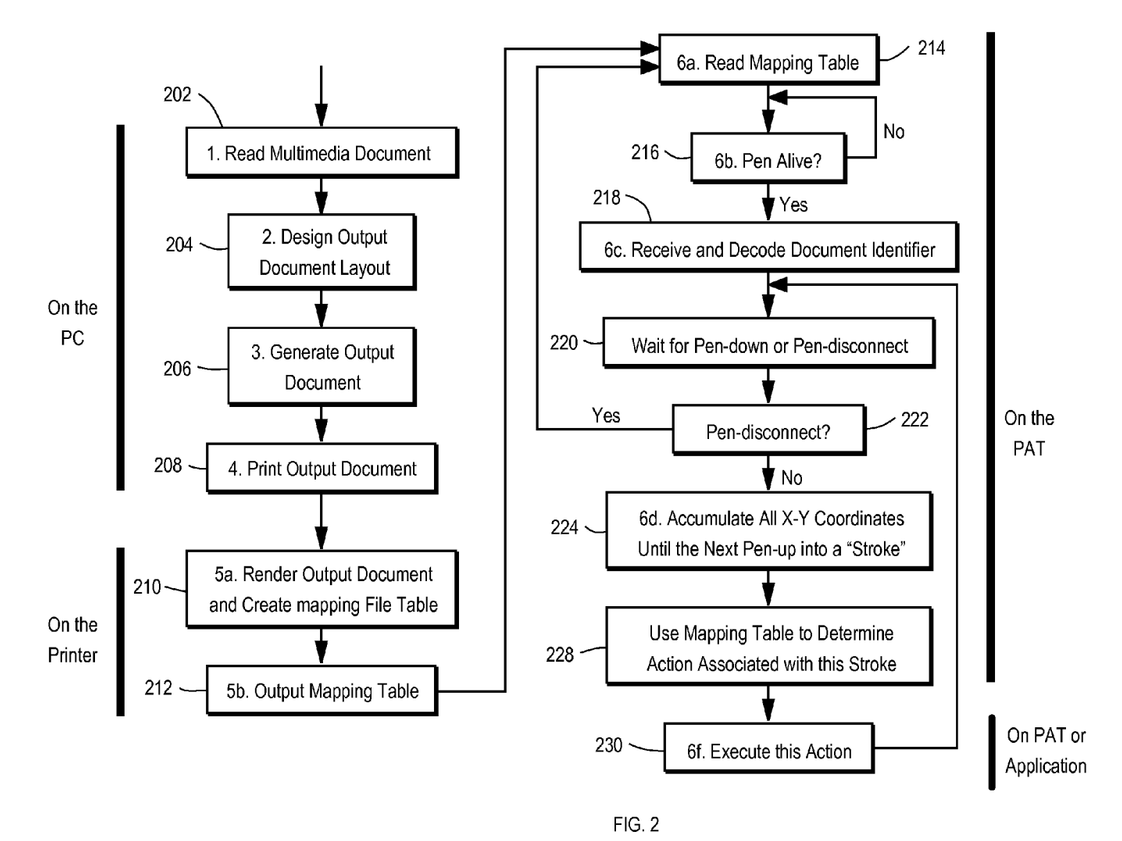
FIG. 2 is a flow chart showing a method performed in accordance with a preferred embodiment of the present invention.

FIG. 2 shows a flowchart for the operation of an embodiment of annotatable document printer (ADP) 106. The steps executed on data processing system 104, ADP 106, PAT 108 and application 114 are shown. In element 202, data processing system 104 receives a multimedia document 102, e.g. a video file or an audio file. Data processing system 104 designs 204 and generates 206 data describing an output document layout, including specification for "hot" zones.

Figure 4:
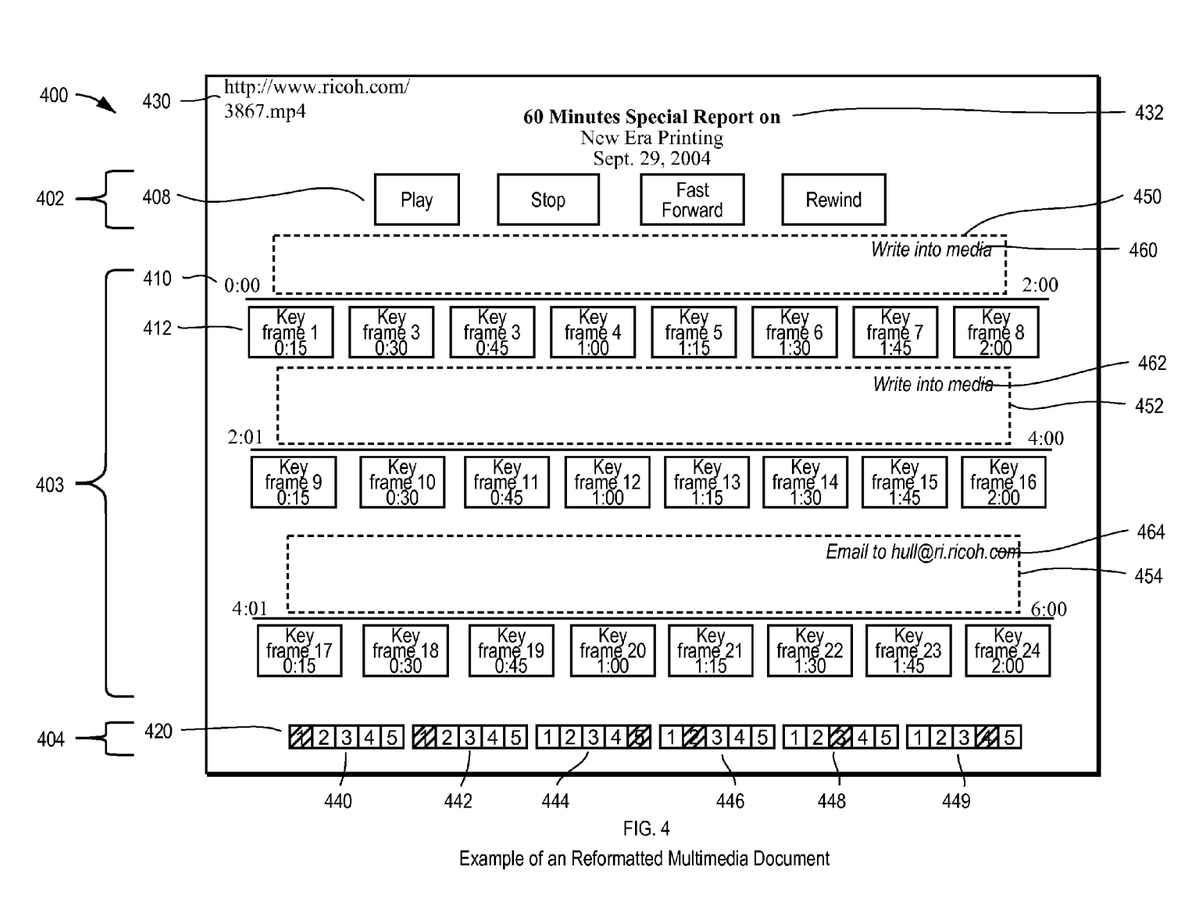
FIG. 4 shows an example of a reformatted multimedia document shown in FIG. 1.
Figure 8:
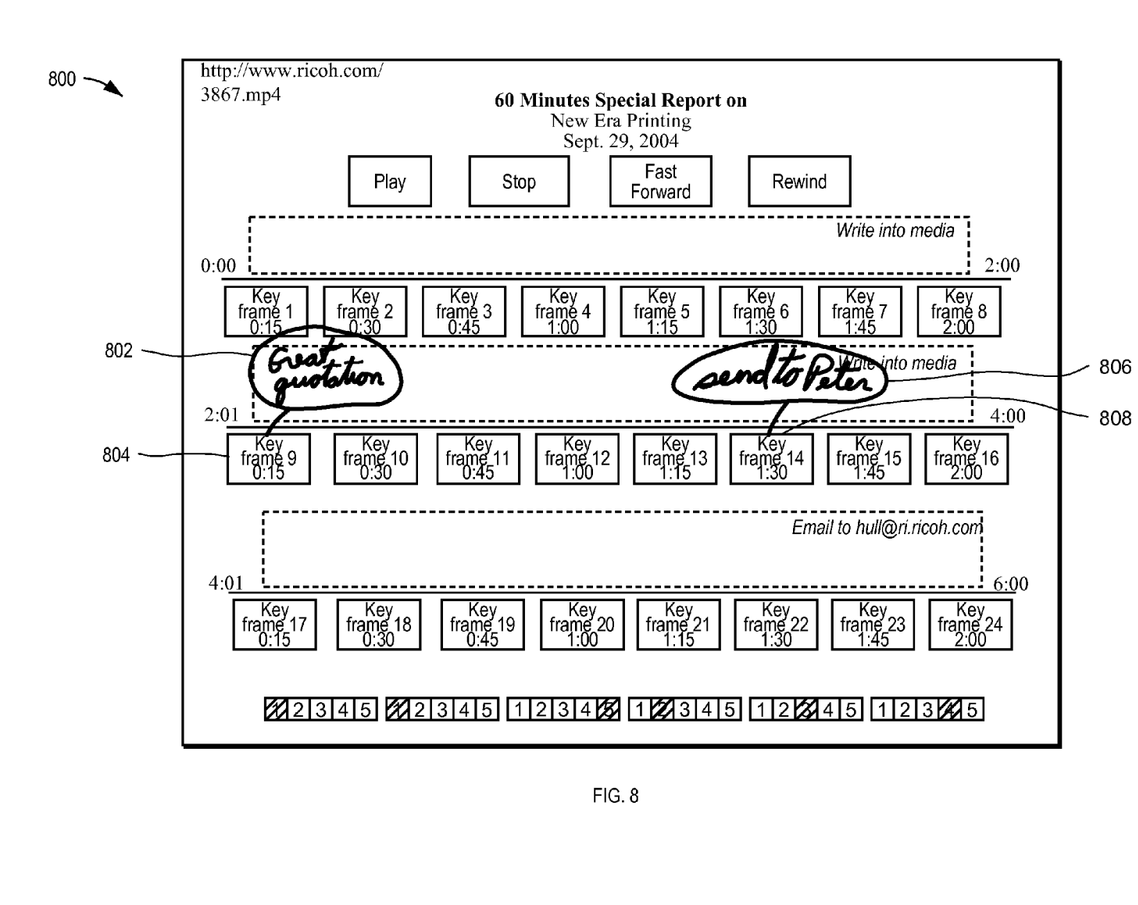
FIG. 8 is an example of a multimedia document to which handwritten annotations have been added.

Hot zones are areas that can be written into with a pen capture system and the handwriting optionally passed along to another application, either in real-time or sometime after the handwriting is applied to the document. Some hot zones may include x-y bounding box coordinates (e.g., in inches from the upper left corner of the page) and at least one action that is to be applied to handwriting entered in that bounding box. Hot zones can also include a transformation from spatial coordinates to time within the multimedia data. For example, a 6-inch wide hot zone can linearly scale to the segment between 2 minutes and 4 minutes. A handwritten annotation made at the left side of that zone would correspond to the 00:02:00 position in the video. Examples of hot zones are shown in FIGS. 4 and 8.

The data processing system 104 generates data representing the output document, automatically transforming the multimedia document received as input according to the document layout specification. Note that the document layout specification may specify a generic layout for more than one physical page in the output document.

In element 208, the designed output document layout is sent to ADP 106. A print driver converts hot zone specifications into comments embedded in a page description language (PDL) file. Note that use of a PDL provides a portable representation that can be used on any printer.

Elements 210 and 212 are preferably performed by ADP 106. In element 210, ADP 106 renders the PDL file to a printable bitmap and creates mapping table 107. Note that printer-specific characteristics, such as scaling of the rendered page are only known when the document is printed (i.e., sent to ADP 106). For example, a page could originally have been generated for letter size but was printed on 11"×17" paper. The ability to change the print characteristics at print time is one reason why the printer must create mapping table 107. ADP 106 outputs mapping table 107 in element 212 to any appropriate storage medium.

Elements 214-228 are preferably performed by PAT 108. In element 214, PAT 108 reads mapping table 107. In one embodiment, the PAT is plugged into the printer to read mapping table 107. In another embodiment, the PAT is connected via a wireless or wired network connection. In another embodiment, a physical medium is carried between the printer and the PAT. In general, PAT 108 can receive the mapping table via any appropriate mechanism. PAT 108 then preferably opens a connection 216 to device 112 to determine if the device 112 is alive. In certain embodiments, PAT 108 receives and decodes 218 a document ID, which is preferably included in the mapping table and confirms that the mapping table corresponds to the reformatted multimedia document.

Next PAT 108 accumulates all the x,y coordinates from device 112 beginning with a pen-down and until the next pen-up into a "stroke" (see elements 220, 222, 224). PAT 108 uses the mapping table to determine 228 whether the stroke is in any of the hot zones and determines a corresponding action in accordance with the mapping table. In element 230, actions such as control actions 408 are executed by multimedia application 114 in response to communication by PAT 108. Other actions, such as "Write into media" or "Email to" preferably are executed by PAT 108. The flow of control then returns to element 220 and repeats until the connection with the pen is terminated.

This system could be implemented with a document layout application 114 such as Microsoft Word or Adobe Acrobat with a plug-in that allows designation of hot zones on the document and associates actions with them. For example, one could draw a box, give a title "Last Name" and associate an action with it such as "Contents uploaded to http://www.ricoh.com/employee_status_change." When that document is printed, the postscript sent to the printer would include embedded comments that instruct the printer to capture the x-y coordinates of the bounding box for the hot zone, its title, and the action associated with the hot zone. That information would comprise the Mapping Table for that printout.

Figure 3:
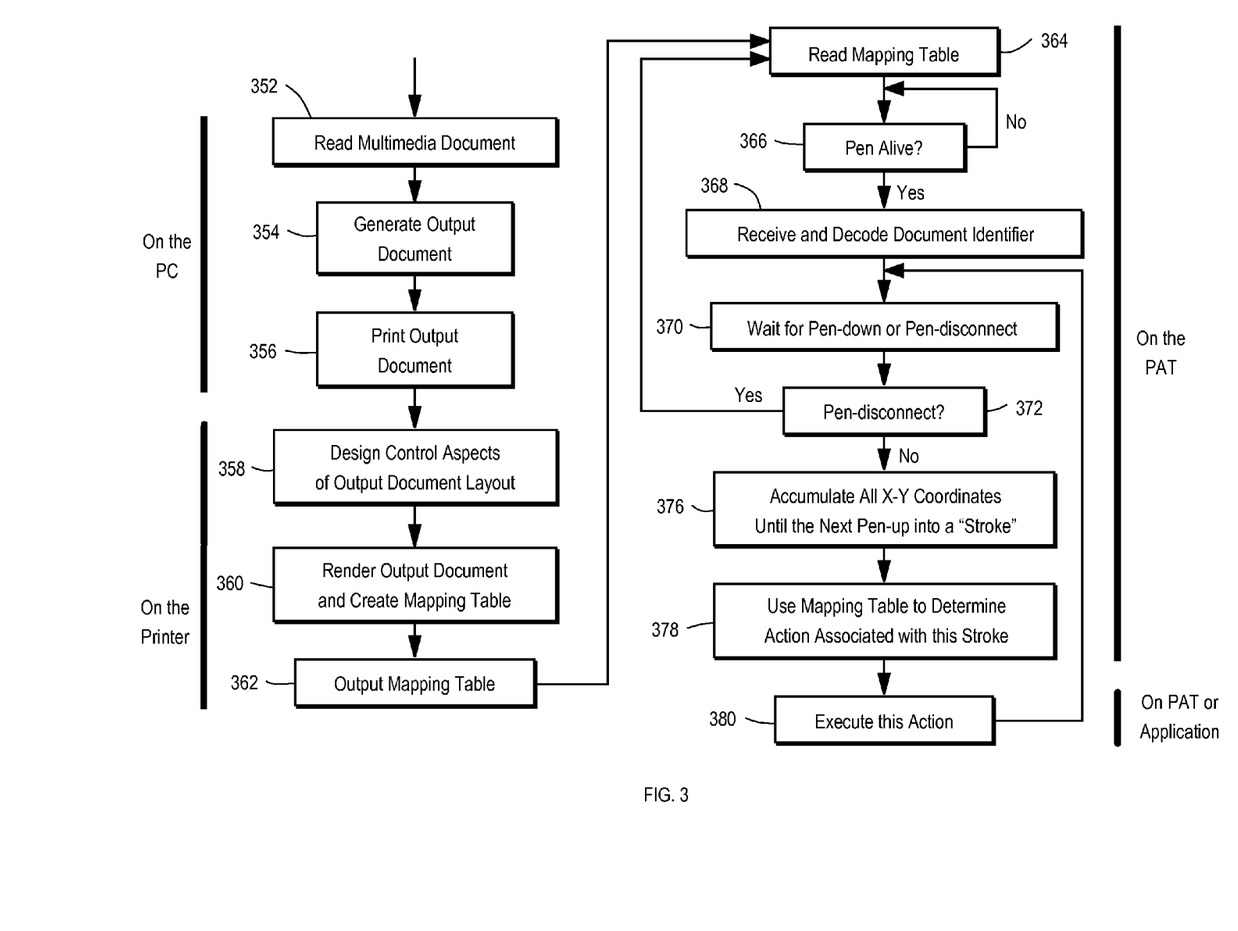
FIG. 3 is a flow chart showing a method performed in accordance with a preferred embodiment of the present invention.

FIG. 3 shows a flowchart for the operation of another embodiment of annotatable document printer (ADP) 106. In this embodiment, more functionality is located in printer and less on data processing system 104. Other embodiments may have functionality that is located in the system elements in locations different from either of FIG. 2 or 3, both of which are provided by way of example.

In this embodiment, data processing system 104 performs a "normal" print function and does not add any control or hot zone information to the document. Thus, in element 352, data processing system 104 receives a multimedia document 102, e.g., a video file. Data processing system 104 generates 354 an output document and sends 356 it to the ADP 106.

In this embodiment, ADP 106 adds the control information such as hot zones. In this embodiment, ADP 106 determines 358 hot zone specifications. Elements 360 and 362 are preferably performed by ADP 106. In element 360, ADP 106 creates mapping table 107 in accordance with the determined hot zones. Note that printer-specific characteristics, such as scaling of the rendered page are only known when the document is printed (i.e., sent to ADP 106). For example, a page could originally have been generated for letter size but was printed on 11"×17" paper. The ability to change the print characteristics at print time is one reason why the printer must create mapping table 107. ADP 106 outputs mapping table 107 in element 362 to any appropriate storage medium, such as a CD, a memory, or a memory of PAT 108.

Elements 364-378 are preferably performed by PAT 108 and are generally the same as element 214-230 of FIG. 2. Element 380 is performed by PAT 108 or application 114, depending on the type of action being performed.

FIG. 4 shows an example of a reformatted multimedia document 110 shown in FIG. 1. This example shows a document that could be marked by the user. The document includes a control area 402, a frame area 403, and a document id area 404. These areas are also called hot zones.

Document control area 402 includes check boxes 408 on the paper document that provide control functions such as Play, Stop, Fast Forward, Rewind, etc. As the user uses device 110 to mark one or more of these boxes, PAT 108 accesses the mapping table to recognize the positions of those marked boxes as corresponding to the indicated commands. When PAT 108 receives input within those ranges of coordinates, the proper commands are transmitted to the multimedia application 114. The example of FIG. 4 shows control functions for a video player. Other embodiments can include control commands for other types of devices.

Frame area 403 includes a first timeline representation 410, showing time values ranging between "0:00" and "2:00" and further includes key frames, such as key frame 412, that are extracted from the video. The key frames are printed so as to correspond to time values on the timeline. The machine that performs video replay preferably includes a timer that shows the current position in the recording. Either before, during, or after the user watches the replay of the video, the user references the corresponding place on the time line and writes free-hand notes on document 400. PAT 108 captures these notes from pen capture system 112 and determines their correspondence to the correct position on the time line derived in accordance with the mapping table. Multimedia application 114 preferably writes those notes back into the multimedia document (for example, as a channel in an mpeg4 representation of the video).

Document ID area 404 includes check boxes 420 on the paper document. Individual documents are identified with a series of numbered checkboxes 420 at the bottom of the page. ADP 106 preferably generates a unique serial number (also called a document ID) for each page and indicates that in the printout by graying out the appropriate boxes. See, for example, element 218 of FIG. 2, which accepts a document ID from a user. FIG. 4 shows an example of the check boxes printed for the document with serial number 115234. The user then fills in the grayed-out boxes at some point while marking up the document. The document ID identifies the specific page (and document) and preferably is used as a registration mark to ensure that the x-y coordinates captured as a result of the user marking up the document correspond to the x-y coordinates generated when the document was printed. In certain embodiments, once the checkboxes 420 are marked by the user, PAT 108 locates marks corresponding to these check boxes and uses the x-y coordinates of their centers of gravity to correct for document skew and translation.

ADP 106 allows the creation of multi-generational (MG) documents. Handwritten annotations applied to the document are captured by PAT 108 and written back into the page description file for that page on the printer as a series of vector draw commands. In a preferred embodiment, ADP 106 caches the PDL to enable this write-back operation. The user can print the next generation of that document (the one that includes the handwriting). Yet another generation could be generated by writing on this new document. For example, zone 452 in FIGS. 4 and 8 has this characteristic. The action "write_into_this_document," as shown in element 512 of FIG. 5 causes the PAT to send the strokes entered in this zone to the printer that produced this document (http://www.rico-h.com/adp_nep__22867) and write the stroke data as a series of vector draw commands into the postscript file 1115234.ps that was cached on this printer.

Figure 7:
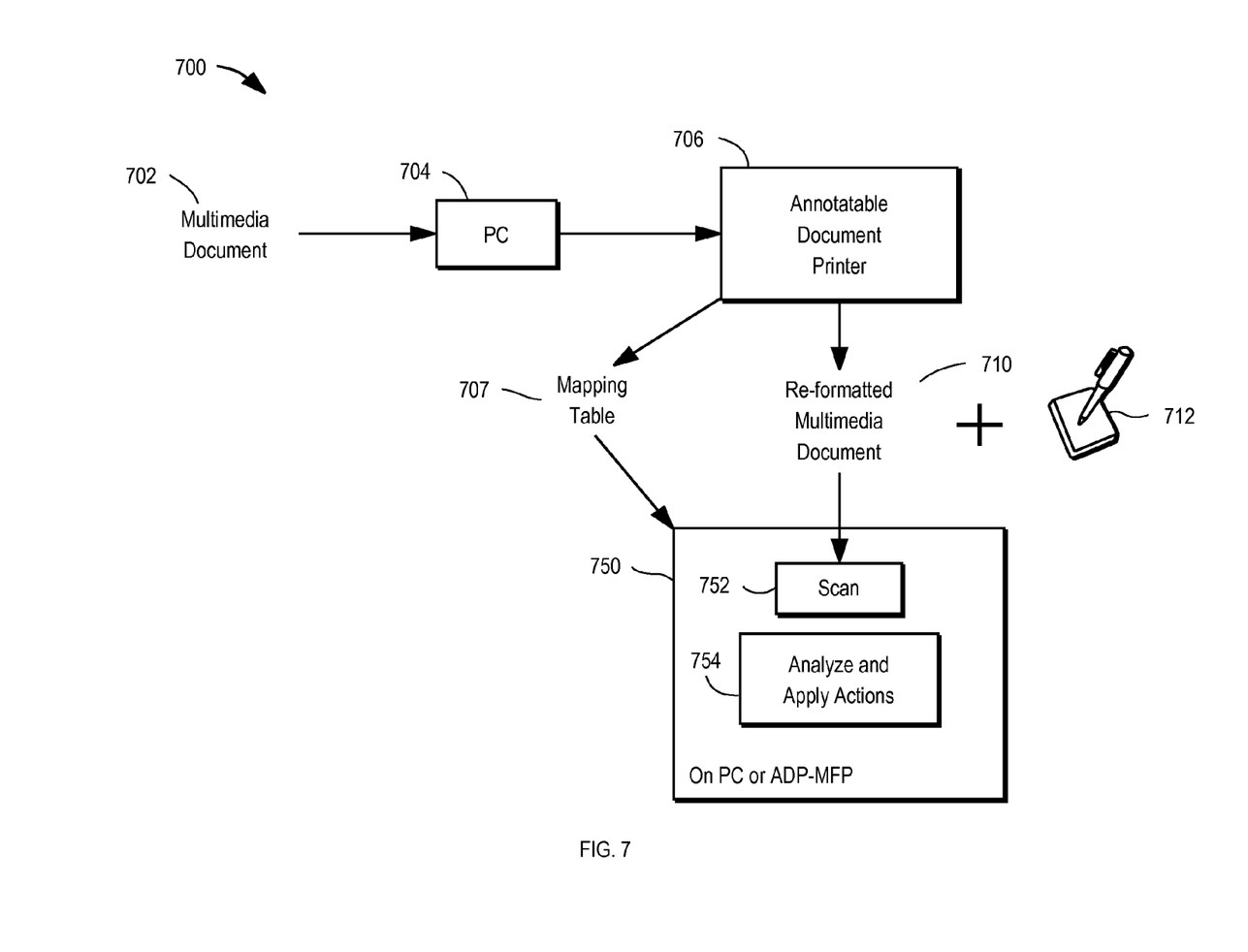
FIG. 7 is a block diagram showing another preferred embodiment of the present invention.

The postscript instructions corresponding to handwritten annotations are, for example, stored as comments in the header of the postscript file, or they could be encoded directly in the postscript data. FIG. 7 shows an example fragment of data generated by a pen capture system that writes a 1-inch long stroke in zone 2 and the corresponding postscript representation (Note: postscript uses a coordinate system based on "point size". There are 72 points per inch.). The next time this document is printed, it will be assigned a new serial number, e.g., 115235, and the process could be repeated.

URL 430 is the name for the original multimedia document 102 from which document 110 was generated. It is printed on the document 110 so the user can easily find it and replay the multimedia while marking up the paper. Some embodiments print information 432 about the multimedia document at the top of the document 110. This information might include, for example, a title and a date that the document was created.

Figure 6A:
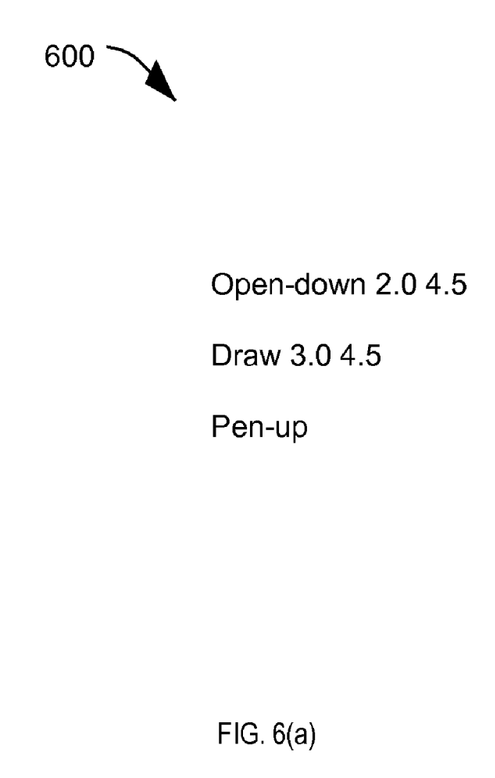
FIGS. 6(a) and 6(b) are, respectively, an example of output from a pen capture system and associated Postcript.
Figure 6B:
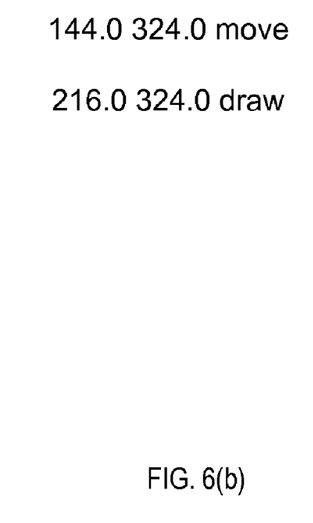

An alternative version of the multi-generational system would store the location of the original symbolic document in the Mapping Table, e.g., \\192.168.0.34\c:\MyDocuments\nep_writeup.doc, and the PAT system would transmit either the output from the pen capture system (e.g., FIG. 6(*a*)), the page description language (e.g., FIG. 6(*b*), note: PDL is an example of a meta language that would be knowable to all document preparation systems), or commands known to the application that created the original document. In this case, that might be drawing commands for Microsoft Word or a bitmap (.bmp file) the PAT application created to over-write the zone (i.e., one inch high and six inches wide positioned at x=1.0" and y=4.0" on the document).

FIG. 5 shows an example 500 of mapping table 107 of FIG. 1. In this example, mapping table 107 is an XML document, having a document ID area 502, a controls area 504, and a notes area 506. In the example, the areas are denoted by tags, such as xml tags, although any appropriate format could be used to store mapping information.

Document ID area 502 contains data that identifies the location of portions of document 110 that will be marked by the user to indicate a document ID and what values marks made in various locations indicate. When a user marks check boxes 420 in FIG. 4 to indicate a document ID (by marking the grayed out boxes printed on the document), PAT 108 uses these marks to locate the correct mapping table to use when interpreting further marks made by the user. In a preferred embodiment, there are a number of potential mapping tables 107 available to PAT 108 and PAT 108 needs to decide which one is appropriate for the document being marked up by the user. In some embodiments, a single mapping table is used for more than one document Ids. In the example, the document ID is "1115234." In the mapping table, each of a series of locations has an associated minimum X, maximum X, minimum Y, maximum Y value associated with it. These locations correspond to locations on the checkboxes 420 that a user would mark to indicate a digit in the document ID. Thus, if a user marks a I in the first set of check boxes 440, a 1 in the second set of checkboxes 442, a 5 in the third set of check boxes 444, a 2 in the fourth set of checkboxes 446, a 3 in the fifth set of check boxes 448, and a 4 in the sixth set of checkboxes 449, PAT 108 determines that the user is looking at and marking up the document having document ID 115234. Note that, in this embodiment, the mapping table contains its own identifier and contains information to tell the PAT where to find that identifier within a document. This feature enables upward compatibility, since various documents can contain various types and formats of documents identifiers. In certain embodiments, it is envisioned that the format of document IDs can be altered or upgraded as needed by reprinting the documents 110 and changing the mapping tables 107.

Controls area 504 contains data that identifies the locations of portions of document 110 that will be marked by the user to indicate control functions. Any marks made by the user in the areas indicated by the x, y coordinates are taken to indicate a corresponding control function, such as play stop, fast forward, or rewind. Data indicating the function is sent to multimedia application 114, where it is used to control playback of the multimedia document.

Notes area 506 contain data that identifies the location of portions of document 110 that will be marked by the user to add notes about the multimedia document. Notes area 506 contains data about a plurality of zones. These zones correspond, for example, to zones 450, 452, and 454 of FIG. 4. In the described embodiment, the data for each zone includes an associated minimum X, maximum X, minimum Y, maximum Y value, a minimum and maximum time, an action, a timing, and a destination. Other embodiments may contain more or fewer types of data.

The X,Y values correspond to locations on the multimedia document 110 in which the user can make handwritten notes. The minimum and maximum time values correspond to the times in the playback to which the notes correspond. The action tells the system what to do with the handwritten data (for example, write it into the document or another document, or convert it to text and email it to a recipient). In other embodiments, an action might include immediately writing the handwritten data to an instant messaging application that would display the handwritten annotations on the screen of another user in real-time. The handwriting could also be displayed on the screen or projector that's showing the multimedia playback. The timing data tells the system whether to perform the action immediately or to delay it. In other embodiments, the timing might tell the system how long to delay or whether to queue the data on the ADP waiting for an instruction to forward it to a specified user.

The destination indicates a destination for the action (for example, add the notes into a document or email the notes to a destination recipient). If the destination is a document, the destination data is a document address, such as a URL or document ID. In the example, a first destination 510 is the address of the PDL for the multimedia document 102. In the example, a second destination 512 is the address of a document other than the PDL. In the example, a third destination 514 is an email address. If the destination is an email recipient, the destination data is an email address. In other embodiments, destinations might be an instant messaging address, a storage location, a fax number, a voice telephone number, a call phone number, a text messaging address, and a cell phone address suitable for receiving multimedia messages. Note that in the described embodiment, the action and destination are printed 460, 462, 464 in the corresponding notes area 450, 452, 454 of reformatted multimedia document 110 so that a human being will know what will be done with his handwritten notes.

FIG. 7 is a block diagram showing another preferred embodiment of the present invention. This implementation uses a normal pen as device 112. At some point later in time the user re-scans 752 the document. Analysis software 754 automatically identifies the document (by OCR of the document ID or recognition of a bar code), use the Mapping Table 707 to find the hot zones on the scanned document, and applies the actions associated with the hot zones. Such actions could include the application of notes back onto specific times in the original multimedia file.

FIG. 8 is an example of a reformatted multimedia document 110 with handwritten annotations. A multimedia document 800 includes notes 802, 806 attached to the timeline at 00:02:15 804 and 00:03:30 808. After scanning this page, the analysis software would locate the point where the handwritten notes crossed the time line, compute the corresponding actual times in the multimedia, and write those notes into the multimedia file, or a meta file associated with it (e.g., an mpeg7 representation). Thus, this embodiment provides a technique for mapping handwritten annotations at arbitrary positions along a time line onto events in a multimedia recording. This lets anyone, by using any writing implement, such a pen, pencil, or crayon, add time-stamped notes to a multimedia recording. The recording does not necessarily have to be playing when the notes are applied to the paper document.

Reference in the specification to "one embodiment," "certain embodiments" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of methods and symbolic representations of operations on data bits within a computer memory. These methodic descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Often, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The methods and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages and Page Description Languages (PDLs) may be used to implement the teachings of the invention as described herein.

Moreover, the present invention is claimed below operating on or working in conjunction with an information system. Such an information system as claimed may be the entire messaging system as detailed below in the preferred embodiment or only portions of such a system. Thus, the present invention is capable of operating with any information system from those with minimal functionality to those providing all the functionality disclosed herein.

While the present invention has been described with reference to certain preferred embodiments, those skilled in the art will recognize that various modifications may be provided. Variations upon and modifications to the preferred embodiments are provided for by the present invention, which is limited only by the following claims.

What is claimed is:

1. A method, comprising:
  receiving a multimedia document comprising content in an original layout, the multimedia document comprising data ordered sequentially with respect to time;
  reformatting the received multimedia document, the reformatting comprising augmenting the data of the multimedia document in the original layout to add at least one hot zone positioned in an area contained by spatial coordinates representing a distinct time range in the sequentially ordered data, and visually located with respect to a sequence of data from the sequentially ordered data to create a visual correspondence between the at least one hot zone and a corresponding sequence from the sequentially ordered data, thereby producing a reformatted multimedia document in an output layout;
  outputting, by a printer, the reformatted multimedia document in the output layout; and
  outputting, by the printer, a mapping table describing at least one action associated with the at least one hot zone of the reformatted multimedia document, the at least one action comprising, responsive to receiving pen strokes within the at least one hot zone, writing a representation of the pen strokes to the received multimedia document at the distinct time range corresponding to the at least one hot zone.

2. The method of claim 1, wherein the multimedia document is a video.

3. The method of claim 1, wherein the multimedia document is a printable document.

4. The method of claim 1, further including:
  receiving pen strokes made on the reformatted multimedia document; and
  interpreting the pen strokes in accordance with the mapping table.

5. The method of claim 4, wherein the pen strokes are made with a pen that creates marks on paper.

6. The method of claim 4, wherein the pen strokes are made with a non-marking stylus.

7. The method of claim 4, further including:
  sending an email to a recipient in accordance with the interpreted pen strokes and the mapping table.

8. The method of claim 4, further including:
  writing data representing the received pen strokes to a file containing the multimedia document received by the printer, in accordance with the interpreted pen strokes and the mapping table.

9. The method of claim 4, further including:
  writing to a file different from a file containing the multimedia document received by the printer, in accordance with the interpreted pen strokes and the mapping table.

10. The method of claim 1, wherein reformatting the received multimedia document further comprises augmenting the data of the received multimedia document to add a second hot zone that allows a user to specify an associated mapping table that comprises instructions for interpreting input from the user in one or more hot zones.

11. The method of claim 1, wherein reformatting the received multimedia document further comprises augmenting the data of the received multimedia document to add a second hot zone that allows a user to control playback of a video player by marking the second hot zone.

12. The method of claim 1, wherein the mapping table includes data representing a plurality of checkboxes, each checkbox corresponding to possible alphanumeric characters in a first position of a document ID and further including data representing which alphanumeric character corresponds to at least one of the plurality of checkboxes.

13. The method of claim 1, wherein the mapping table includes data representing locations of a plurality of control areas, and further including data representing which control areas correspond to which of a plurality of control functions for a video or audio playback machine.

14. The method of claim 1, wherein the mapping table includes data representing locations of a plurality of hot zones, and further including data representing a time window associated with at least one of the plurality of hot zones.

15. The method of claim 1, wherein the mapping table includes data representing locations of a plurality of hot zones, and further including data representing an action associated with at least one of the plurality of hot zones.

16. The method of claim 1, wherein the mapping table includes data representing locations of a plurality of hot zones, and further including data representing a timing value associated with at least one of the plurality of hot zones.

17. The method of claim 1, wherein the mapping table includes data representing locations of a plurality of hot zones, and further including an action and a destination for the action associated with at least one of the plurality of hot zones.

18. The method of claim 1, further including:
receiving the pen strokes made on the reformatted multimedia document;
interpreting the pen strokes in accordance with the mapping table; and
writing data representing the received pen strokes to a file containing the multimedia document received by the printer in accordance with the interpreted pen strokes and the mapping table, wherein the file is a video file and wherein the writing step is performed at a time when the video file is not being played back.

19. The method of claim 1, further including:
scanning the pen strokes made on the reformatted multimedia document;
interpreting the pen strokes in accordance with the mapping table; and
writing data representing the scanned pen strokes to a video file in accordance with the interpreted pen strokes and the mapping table, wherein the writing step is performed at a time when the video file is not being played back.

20. A method, comprising:
receiving a document file comprising multimedia data ordered sequentially with respect to time and a plurality of designated timeline input areas contained by spatial coordinates and capable of receiving pen strokes, each designated timeline input area corresponding to a plurality of distinct key multimedia frames in multimedia data, and spatial coordinates of each designated timeline input area representing a distinct time range corresponding to the plurality of distinct key frames of the received document file, and visually located with respect to the corresponding plurality of distinct key frames to create a visual correspondence between each of the designated timeline input area and the corresponding plurality of distinct key frames;
receiving pen strokes within one of the plurality of designated timeline input areas of the document, the one of the plurality of designated timeline input areas associated via a mapping table with an action comprising, responsive to receiving pen strokes within the one of the plurality of designated timeline input area, writing a representation of the pen strokes to the received multimedia document at distinct time range corresponding to the one of the plurality of designated timeline input area;
determining pen strokes spatial coordinates of the pen strokes within one of plurality of the designated timeline input areas;
linearly scaling the pen strokes spatial coordinates to a corresponding time offset in the multimedia data; and
writing to the file, at the corresponding time offset, data representing the pen strokes.

21. A system, comprising:
a printer that:
receives a multimedia document comprising content ordered sequentially with respect to time and in an original layout,
reformats the received multimedia document by augmenting the content of the multimedia document in the original layout to add at least one hot zone positioned in an area contained by spatial coordinates representing a distinct time range in the sequentially ordered content, and visually located with respect to a sequence of content from the sequentially ordered content to create a visual correspondence between the at least one hot zone and the corresponding sequence of content, thereby producing a reformatted multimedia document in an output layout, and
outputs the reformatted multimedia document in the output layout; and
a data storage medium containing a mapping table that describes at least one action associated with the at least one hot zone of the reformatted multimedia document, the at least one action comprising, responsive to receiving pen strokes within the at least one hot zone, writing a representation of the pen strokes to the received multimedia document at the distinct time range corresponding to the at least one hot zone.

22. The system of claim 21, wherein the multimedia document is a video.

23. The system of claim 21, wherein the multimedia document is a printable document.

24. The system of claim 21, further including:
a device to receive pen strokes made on the reformatted multimedia document; and
a device to interpret the pen strokes in accordance with the mapping table.

25. A computer program product including a computer readable medium comprising executable instructions thereon, the instructions capable of causing a data processing system to:
receive a multimedia document comprising content in an original layout, the multimedia document comprising data ordered sequentially with respect to time;
reformat the received multimedia document, the reformatting comprising augmenting the content of the multimedia document in the original layout to add at least one hot zone positioned in an area contained by spatial coordinates representing a distinct time range in the sequentially ordered data, and visually located with respect to a sequence of data from the sequentially ordered data to create a visual correspondence between the at least one hot zone and the corresponding sequence of data, thereby producing a reformatted multimedia document in an output layout;
output, by the a printer, the reformatted multimedia document in the output layout; and
output, by printer, a mapping table describing at least one action associated with the at least one hot zone of the reformatted multimedia document, the at least one action comprising, responsive to receiving pen strokes within the at least one hot zone, writing a representation of the pen strokes to the received multimedia document at the distinct time range corresponding to the at least one hot zone.

26. The computer program product of claim 25, wherein the multimedia document is a video.

27. The computer program product of claim 25, wherein the multimedia document is a printable document.

28. A computer readable medium comprising executable instructions thereon, the instructions capable of causing a data processing system to:
- receive a document file comprising multimedia data ordered sequentially with respect to time and a plurality of designated timeline input areas contained by spatial coordinates and capable of receiving pen strokes, each designated timeline input area corresponding to a plurality of distinct key multimedia frames in multimedia data, and spatial coordinates of each designated timeline input area representing a distinct time range corresponding to the plurality of distinct key frames of the received document file, and visually located with respect to the corresponding plurality of distinct key frames to create a visual correspondence between each of the designated timeline input area and the corresponding plurality of distinct key frames;
- receive pen strokes within a one of the plurality of designated timeline input areas of the document, the one of the plurality of designated timeline input areas associated via a mapping table with an action comprising, responsive to receiving pen strokes within the one of the plurality of designated timeline input area, writing a representation of the pen strokes to the received multimedia document at distinct time range corresponding to the one of the plurality of designated timeline input area;
- determine pen strokes spatial coordinates of the pen strokes within one of plurality of the designated timeline input areas;
- linearly scale the spatial coordinates to a corresponding time offset in the multimedia data; and
- write to the file, at the corresponding time offset, data representing the pen strokes.

29. A method, comprising:
receiving a video file;
reformatting the received video file, thereby producing an output layout, the output layout comprising a plurality of designated timeline input areas, each designated timeline input area contained by spatial coordinates, representing a distinct time range corresponding to a plurality of distinct key frames of the received video file, and visually located with respect to the distinct key frames to create a visual correspondence between the designated timeline input area and the corresponding plurality of distinct key frames;
outputting, by a printer, the reformatted video file in the output layout; and
outputting, by the printer, a mapping table describing at least one action associated with at least one of the plurality of designated timeline input areas of the output layout, the at least one action comprising, responsive to receiving written input within the at least one of the plurality of designated timeline input areas, writing a representation of the written input to the received video file at the distinct time range corresponding to the at least one of the plurality of designated timeline input areas contained by the spatial coordinates.

30. The method of claim 29, wherein the plurality of designated timeline input areas are arranged in sequential order with respect to time values of the corresponding plurality of distinct key frames of the video.

31. The method of claim 20, wherein linearly scaling the spatial coordinates to a corresponding time offset in the multimedia data is performed based at least in part on a size of the input area.

32. The method of claim 1, wherein writing the representation of the pen strokes to the received multimedia document comprises:
- determining a point in the at least one hot zone where the received pen strokes cross a boundary of the at least one hot zone;
- determining a temporal location in the multimedia document corresponding to the crossed point; and
- writing the representation of the received pen strokes at the determined temporal location in the multimedia document.

33. The method of claim 1 wherein the at least one action further comprises responsive to receiving pen strokes within the at least one hot zone, writing a representation of the pen strokes to an electronic message.

34. The method of claim 1 wherein the at least one action further comprises responsive to receiving pen strokes within the at least one hot zone, displaying a representation of the pen strokes on a screen.

* * * * *